Sept. 4, 1945.  W. P. LEAR  2,384,317
RADIO DIRECTION FINDING SYSTEM
Filed March 1, 1940   3 Sheets-Sheet 3

INVENTOR.
William P. Lear
BY Richard A. Marsen
ATTORNEY.

Patented Sept. 4, 1945

2,384,317

UNITED STATES PATENT OFFICE 2,384,317

RADIO DIRECTION FINDING SYSTEM

William P. Lear, Chicago, Ill., assignor, by mesne assignments, to Lear, Incorporated, Piqua, Ohio, a corporation of Illinois Application March 1, 1940, Serial No. 321,623

12 Claims. (Cl. 250—11)

This invention relates to radio direction finding systems and more particularly relates to novel switching arrangements for automatic direction finder circuits. This case is a continuation-in-part of my Patent No. 2,308,521 issued on January 19, 1943, entitled "Automatic radio direction indicator."

In accordance with the present invention, I provide simple switching arrangements for readily converting an automatic unidirectional indication system either to manual directional reception, or to non-directional reception for communication or radio range navigation, or to automatic bi-directional indication during excess static reception conditions. Severe static conditions at times encountered in flight, sometimes renders automatic directional indications indefinite; or if definite, renders corresponding aural reception unintelligible. For such conditions I provide an auxiliary directional antenna for the automatic directional system connectible with the usual directional antenna, and arranged to give accurate "in-line" directional indications during even severe static reception, as well as give intelligible voice reception. Such directional indication, however, is bi-directional in nature, being uncertain only as to the 180° position.

The automatic bi-directional reception is effected by substituting a directional antenna for the non-directional antenna of an automatic unidirectional system, while using essentially the same receiver of the unidirectional system. The present invention is illustrated in connection with the unidirectional 360° automatic direction finder system and circuits disclosed in the parent case Patent No. 2,308,521 referred to above. Two loop antennae are employed for the bi-directional circuit, both antennae being physically coupled together. The bi-directional indications are accurate in degrees, but have reciprocal ambiguity. The pilot, however, can ascertain his relative 180° position with respect to his heading and to the directional bearing indicated, and is thus in a position to resolve the 180° ambiguity of the bi-directional indications. One method of resolving the 180° position is to switch the system to unidirectional operation and check the quadrant of the unidirectional bearing. Another is to maneuver the aircraft off-course for check bearings, or to rely on other navigational devices on the plane.

It is accordingly an object of my present invention to provide novel multi-circuit switching arrangements for radio direction finder systems.

Another object of my present invention is to provide a novel switching arrangement for a direction finder system, capable of readily converting the system into any one of several distinct modes of operation.

Still another object of my present invention is to provide a novel automatic direction finder system giving accurate "in-line" bearing indications during severe static conditions.

A further object of my present invention is to provide a novel radio direction finder system having circuit arrangements for ready conversion from unidirectional operation to bi-directional operation for static reception conditions.

These and further objects of my present invention will become apparent in the following description of preferred embodiments of the invention, illustrated in the drawings, in which.

Figure 1:
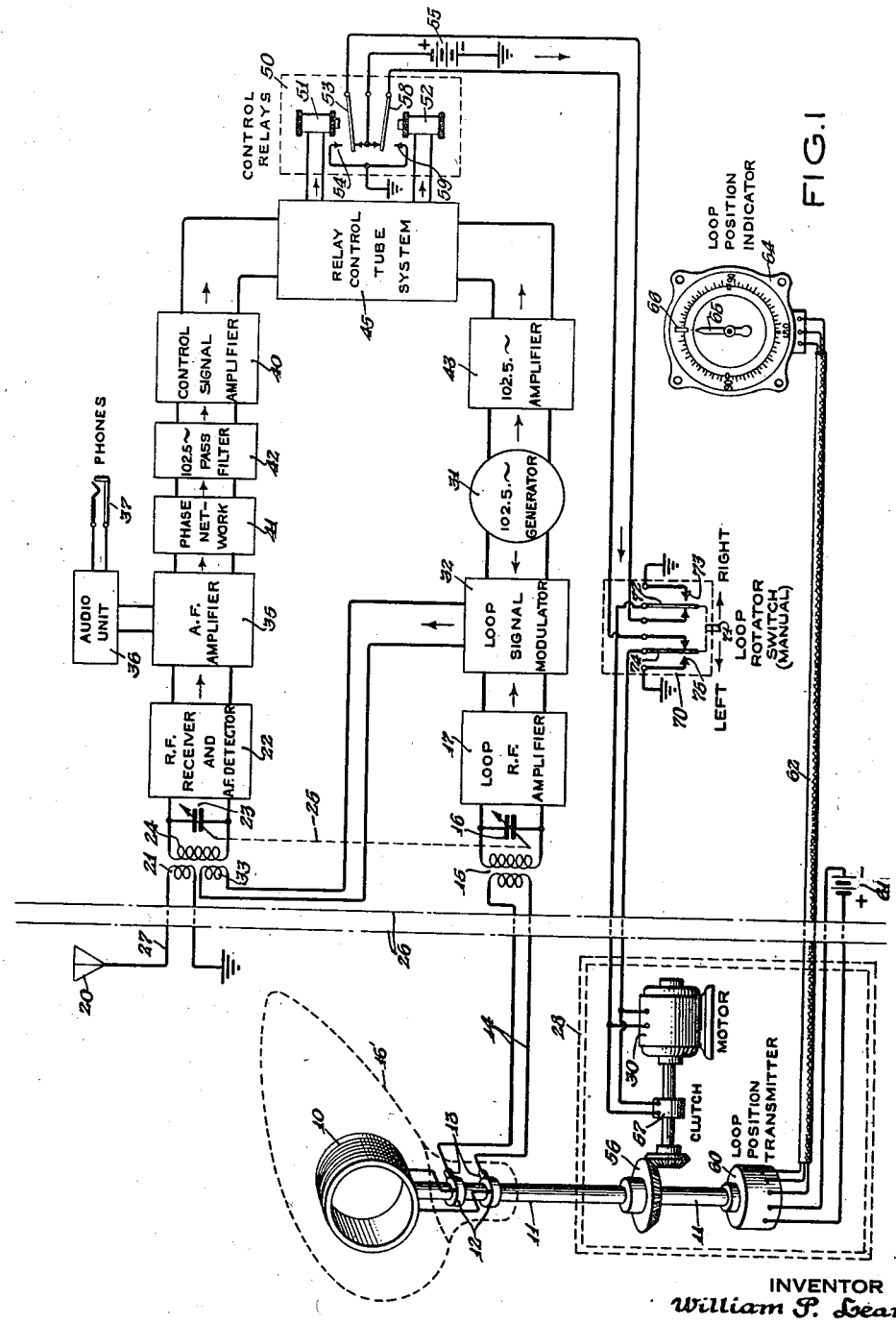
Fig. 1 is a diagrammatic representation of a complete automatic direction finder system to which my present invention is applicable.

Fig. 1 is an electrical block diagram illustrating the coaction of the components entering into the automatic direction finder. A coil wound directional or loop antenna 10 is mounted at the end of rotatable shaft 11, and arranged for free rotation in either direction over the full 360 degrees of arc. The leads of loop antenna 10 terminate in slip rings 12 coacting with brushes 13 for electrical connection thereto. Low impedance cable 14 electrically connects brush 13 to the primary winding of the loop signal radio frequency transformer 15. Loop antenna 10 is preferably designed with a relatively low impedance or number of turns in order to efficiently receive signal energy over a wide frequency range and transmit the received radio signals to remotely situated radio frequency tuning units. Loop antenna 10 is mounted outside of the aircraft for most efficient signal pick-up, preferably on top of the fuselage to minimize the possibility of mechanical injury. A streamline housing indicated in dotted lines at 16' may be used to protect the loop antenna from wind currents and external injury, and to minimize its aerodynamic resistance.

A variable condenser 16, in shunt with the secondary of radio transformer 15, is used to tune-in the desired radio station. The magnitude of the tuned-in radio signal impressed upon the input of the loop radio frequency amplifier 17 depends upon the angular position of the loop antenna 10 with respect to the direction of the oncoming radio waves. When the loop antenna is in its null position, with its plane perpendicular to the direction of the oncoming radio waves, no signal is impressed upon transformer 15 of amplifier 17. When the plane of the loop differs from this position, the magnitude of the radio signal impressed upon the input of amplifier 17 increases in accordance with the degree of the off-null position. The phase of the radio signal impressed upon amplifier 17 changes by 180 degrees as the loop passes from either side of its null signal position. Thus, the signal impressed upon loop radio frequency amplifier 17 depends in magnitude and phase upon the relative direction and angular deviation of loop antenna 10 with respect to the direction of the on-coming radio waves. My invention may be practiced with any other known rotatable directional antenna in place of the preferred loop antenna shown, or with a radiogoniometer having a fixed antenna and a rotatable coupling coil.

A non-directional antenna 20 such as a mast, whip, or wire antenna is used to receive the same radio signal as the loop antenna and impress it upon primary winding 21 of the radio frequency transformer coupled to the input of radio frequency receiver and audio frequency detector unit 22. A variable condenser 23 is shunted across secondary 24 of the input transformer for tuning-in the desired radio station. All tuning controls of the system are preferably ganged together as schematically indicated by dotted line 25 connecting tuning condensers 16 and 23. It is to be understood that the several tuning controls of the respective amplifiers and other units of the system are mechanically ganged together to provide a unitary tuning control. It is to be further understood that a plurality of receiving bands may be employed to permit operation of the direction finder over a wide range of radio transmission frequencies. The single loop antenna used is designed to efficiently pick-up radio signals over a wide frequency range, including the higher frequencies. Thus by making the effective height of the loop relatively low, the low inductance thereof will permit efficient reception at the higher end of the frequency range, such as at 2500 kilocycles or higher, and also serve well on the lower frequency range, such as at 250 kilocycles or less.

The tuning controls and indicators of the system are arranged to be placed in the cockpit adjacent the pilot. Antennae 10 and 20 are preferably placed outside the aircraft remotely from the cockpit. Vertical parallel dashed lines 26 indicate a substantial separation of the antennae and associated controls from the radio circuits of the system. Loop transmission cable 14 is designed to efficiently couple the loop antenna with input transformer 15 of the loop radio frequency amplifier. Lead-in 27 from non-directional antenna 20 is preferably unshielded and not placed close to metal structures, in order to keep its capacity to ground as low as possible. A motor drive 30 for loop antenna 10 is mounted adjacent loop shaft 11 in electrically shielded housing 28. A loop position transmitter 60 is mechanically connected to loop shaft 11 for telemetering the angular position of the loop antenna 10 to loop position indicator 64 in the cockpit.

In my present invention I provide a control signal, dependent upon the received loop antenna signal, to operate a motor drive for the loop antenna and rotate it to its null position with respect to the oncoming signals. The normal or stable position of the loop antenna of the system is at the null or electrical neutral position with respect to the oncoming radio signals, giving an exact angular indication of the direction to the transmitter of the radio signals. When the angular position of the loop antenna is changed from null, such as during flight, a radio signal is picked-up by the loop and impressed upon amplifier 17. The magnitude and phase of this signal depends upon the amount of the off-null angular position and the direction to the right or left thereof, respectively. A local generator 31 of an audio frequency current, preferably of the order of one hundred cycles, is used to modulate the radio signals derived from the loop antenna and produce a resultant tone modulated radio signal. I prefer to use a tone signal of 102.5 cycles as indicated in the drawings, but a different frequency may instead be used. Loop signal modulator 32 schematically designates the modulation stage, preferably a balanced modulator, for combining the loop signal of 17 with the tone signal of 31.

The resultant tone modulated radio signal at 32 has a magnitude and sense dependent upon the off-null position of the loop antenna. The tone modulated signal is then suitably combined with the non-directionally received signal from antenna 20 by a coupling means, such as coupling coil 33 linked with secondary winding 24 of the input-transformer to radio frequency receiver 22. As described in the parent patent, particularly in connection with Fig. 3 therein, the superposition of the non-directional radio signals with the tone modulated loop signals provides a resultant radio signal bearing the original sound or voice modulations of the transmitted radio wave plus a tone signal component having a magnitude and relative phase dependent upon the off-null position of the loop antenna. Radio frequency receiver 22 may be a tuned radio frequency circuit or the superheterodyne circuit described hereinafter. The receiver unit 22 contains a demodulator or detector for the audio frequency components of the amplified radio signals. The audio frequency signals at the output of unit 22 comprise the sound or voice modulations of the original radio wave plus the tone or control signal obtained when the loop antenna is off-null.

An audio frequency amplifier 35 is connected to the output of receiver-detector unit 22. Amplifier 35 supplies audio unit 36 with sufficient energy for operating headphones connectable to jack 37 at the output thereof. The output of audio frequency amplifier 35 is also connected to a separate control signal amplifier 40 through a suitable phase shifting net-work 41 and tone or 102.5 cycle pass filter 42. The tone signal is thus filtered out from the output of audio frequency amplifier 36 and amplified a substantial degree for use as a control signal to operate the relay control tube system indicated at 45. The relay control tube system is energized by both the control signal from amplifier 40 as well as a correspondingly amplified tone signal obtained directly from generator 31 and intermediate tone amplifier 43. Details of the operation and interrelation of the respective control signals and the relay control tube system 45 is described in Patent No. 1,308,522 referred to above.

Control relays indicated at 50 comprise solenoids 51 and 52 connected to the relay control tube system 45. Solenoids 51 and 52 are selectively energized from control system 45 in accordance with the angular position to the right or left of the null position of loop antenna 10 with respect to the direction of the oncoming radio waves. When relay 51 is energized, it attracts its armature 53 to close the electrical circuit through ground including front contact 54, battery 55, and motor 30. Motor 30 is connected in a predetermined manner to operate in a direction to rotate loop antenna 10 towards its null signal position through its shaft 11 and gearing 56. Energization of either relay 51 or 52 is determined upon the direction of the angular deviation of loop antenna 10 from its null position, so that the proper counter-rotation of motor 30 will occur to bring the loop antenna to the null signal position. Gearing 56, shown as beveled gears, may be a worm and worm gear drive, and preferably has a high reduction ratio.

Relay 51 remains energized until loop antenna 10 is rotated to reach its null position, whereupon the control signal derived from the loop signal impressed upon amplifier 17 is so reduced in value or obliterated as to cause relay armature 53 to drop back to its neutral or back contact position, deenergizing and stopping motor 30. Electromagnetic clutch 57 is electrically shunted across the motor energization circuit to immediately disconnect the motor from the loop antenna, insuring a rapid stop of the loop rotation at the time of motor deenergization, and eliminating the possibility of overshooting or overdriving by the motor due to its mechanical inertia. The frictional forces of gearing 56 and the bearings of the loop are generally sufficient to quickly stop the loop rotation. An electromagnetic brake may be connected for braking the loop upon motor deenergization. The high reduction gearing ratio at 56 minimizes possible overshooting of the loop, since one revolution of the motor causes only a small fractional degree of angular rotation of the loop.

In practice I have constructed systems in accordance with the present invention which automatically operate the loop and therefore the bearing indicator at a rate of 180° and more per second. The accuracy of the resultant bearing may readily be made within 1° of arc, i. e. the actual directional indication on the radio station being correct to within 1° or less. The bearing indications are on a 360° dial and move to the stationary bearing position through the shorter angular path.

When loop antenna 10 reaches, or is substantially at, its null signal position a zero or substantially zero radio frequency signal is impressed upon radio frequency amplifier 17 for modulation at 32 by the generated tone signal from 31. The magnitude of the control signal from amplifier 40 accordingly is also zero, or substantially zero at that time, and control relays 50 are in the deenergized position shown. The loop accordingly remains stationary when it is at its electrical signal null position with respect to the direction of the oncoming waves. This position corresponds to the geometric position of the loop where the plane of the open face thereof is perpendicular to the direction of the oncoming radio waves. Should the aircraft carrying the loop antenna deviate from this direction the loop will be energized by the radio signal and impress it upon amplifier 17 with a magnitude and phase relation corresponding to the altered direction thereof. Should the deflection of the aircraft cause the loop to receive a signal of phase corresponding to that which energizes solenoid 51, the above described operation of motor 30 is repeated to bring the loop to the new null signal position. Should, however, the aircraft turn so that loop 10 is deviated in the opposite angular direction, the phase of the control signal impressed upon relay control tube system 45 will be different by 180° and energize solenoid 52 instead.

When solenoid 52 is energized, its armature 58 is attracted to front contact 59 to electrically complete the motor 30 circuit including clutch 57, ground, and battery 55. Electro-magnetic clutch 57 is thereupon immediately engaged and motor 30 is rotated in the direction opposite to that corresponding to its energization by solenoid 51. Motor 30 is a reversible one in the present case, and is not necessarily a direct current type. Relay armatures 53 and 58 are arranged so that the direction of current flow through motor 30 is selectively reversed to cause motor 30 to rotate loop 10 towards its null signal position in the shorter path of rotation. Thus, when solenoid 52 is energized, motor 30 will rotate in a direction opposite to that due to energization of relay 51. Clutch 57 becomes engaged and loop antenna 10 is rotated to its null position in a direction opposite to that when relay 51 is energized, which direction is the shorter path of rotation since the signal results from an opposite loop deflection from null.

An indicator is secured to the loop antenna for pointing out its direction and gives a true reading of the bearing on a radio station. The loop antenna is generally placed remote from the cockpit. A telemetering arrangement is connected to the loop antenna and a remote 360 degree indicator is provided to show the pilot the exact angular position of the loop at any time. The metering system diagrammatically shown in Fig. 1 comprises a loop position transmitter 60 mechanically secured to loop shaft 11. A direct current Selsyn type telemetering system is suitable for this purpose, and is described in more detail in the parent application. Loop position transmitter 60 is energized by direct current source 61 and is connected by three-wire cable 62 to remote loop position indicator 64 mounted in the cockpit adjacent the pilot. Pointer 65 of indicator 64 moves in exact correspondence with loop antenna 10, and is arranged to point to the center zero position 66 shown on the dial, when the axis of loop 10 is parallel to the axis of the aircraft, i. e. when the open plane of the loop is perpendicular to the direction of flight of the aircraft.

When pointer 65 is at its center zero position shown, the direction of the oncoming radio waves as received by the system is directly in line with the aircraft, the position of the radio station corresponding to the center zero reading being directly ahead or on-course with respect to the direction of flight. When the aircraft deviates from on-course and flies toward the left of the transmitter station, the loop antenna will receive a radio signal which causes the generation of a control signal to operate either of control relays 51 or 52 to immediately return the loop antenna to the null position with respect to the direction towards the transmitter station. Indicator needle 65 accordingly is moved to continuously point towards the fixed ground station.

A deviation of flight towards the left of the station will cause the needle to deflect towards the right of zero point 66 by an equal number of degrees of arc. For example, should the aircraft deflect 10 degrees off-course the needle 65 will immediately rotate 10 degrees toward the right and the pilot will immediately be apprised of his new course with respect to the radio station. Center zero 66 corresponds to the direction of the course of flight, and the angular position of needle 65 corresponds to the actual direction to the radio station with respect to the direction of flight. Conversely, should the pilot deflect his aircraft 10 degrees towards the right of the direction to the radio station, needle 65 will then deflect 10 degrees towards the left. The pilot thus need merely remember that indicator needle 65 exactly points out the actual position of the radio ground station. He then simply maneuvers his aircraft to adjust his angular direction of flight with respect to the direction to the radio station. The accuracy of indication is independent of the position of indicator needle 65 since any reading thereof corresponds to an electrical null position of the loop, and no balancing of electrical parameters or signal components are required to maintain the readings. It is thus possible for the pilot to fly at any desired angle with respect to a radio station by merely maintaining the indicator needle 65 at that angular position on the dial.

A manual loop rotator switch 70 is provided to permit the pilot to rotate the loop independently of the automatic direction finder control. Thus when the equipment is used as a manual direction finder or when voice reception is desired on the loop alone during static conditions (which operation may be effected by the selector switching arrangement 100 shown in Fig. 2), the pilot operates button 71 of the rotator switch for direction control of the loop position. When button 71 is pressed towards the right, armature 72 thereof is connected to ground through contact 73. Motor 30 together with clutch 57 is energized from battery 55 to cause loop 10 to rotate in a corresponding direction. Similarly, when button 71 is pushed towards the left, and armature 74 thereof is connected to ground through contact 75, the motor is made to rotate loop 10 in the opposite direction, independently of the operation of the automatic direction finder circuit.

Figure 2:
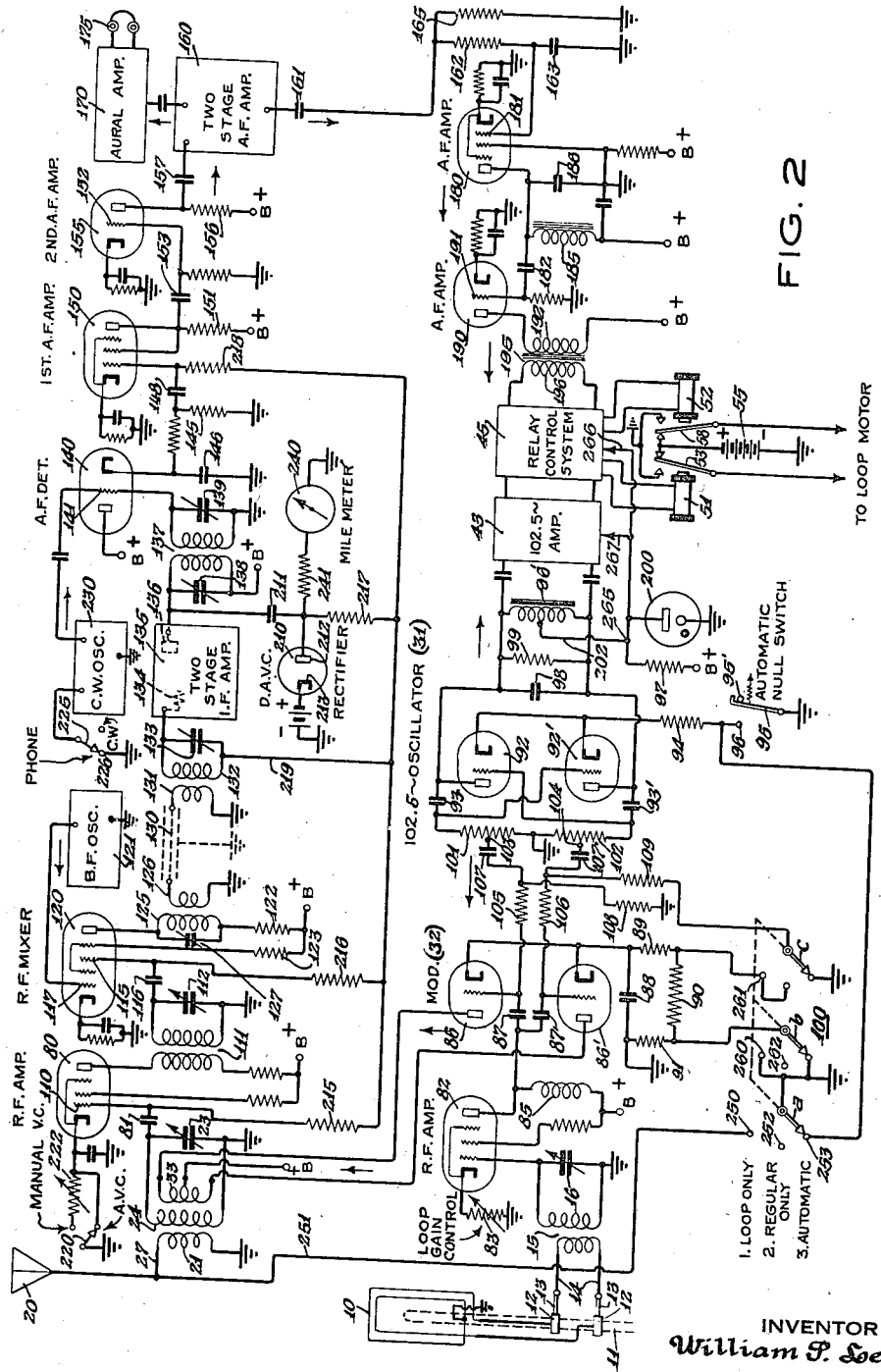
Fig. 2 is a schematic circuit diagram of the direction finder system of Fig. 1, illustrating a switching arrangement for altering its mode of operation.

Fig. 2 is a schematic electrical circuit diagram, partially in block form, illustrating electrical details of important features comprising a practical automatic direction finder system constructed in accordance with the principles of my present invention. Non-directional antenna 20 is connected to primary winding 21 of the radio frequency input transformer, the secondary winding 24 of which is coupled to the control grid electrode 110 of radio frequency pentode amplifier 80 through coupling condenser 81. Secondary winding 24 is shunted by a variable tuning condenser 23. Tertiary winding 33 is coupled to winding 24 for simultaneously impressing therein the tone modulated loop radio frequency signals emanating from loop signal modulator 32.

The rotatable directional antenna 10 is preferably one similar to that described in connection with Fig. 1. A low impedance type loop antenna is used with both sides balanced to ground. Satisfactory directional reception is feasible over a radio frequency range from as low as 180 kilocycles up to 2800 kilocycles using a single loop antenna of about 20 microhenries inductance. The loop antenna will have a 20 ohm impedance at the lower frequency, and a 400 ohm impedance at the higher frequency. Loop transmission cable 14 has a capacitive reactance and aids in the efficient tuning and reception of the radio signals by the loop antenna. A transmission cable having a capacitance of about 600 micro-microfarads is suitable for use with the 20 microhenries loop antenna, and connects the loop antenna to the input of loop amplifier stage 82. Due to the low impedance of the loop and proportionally low capacity cable 14, it is possible to use an exceptionally long loop cable without serious transmission loss.

Signals from rotatable loop antenna 10 are picked off from slip rings 12 by brushes 13 and electrically connected to the primary of radio frequency transformer 15 through transmission cable 14. Radio frequency transformer 15 is preferably of the highly efficient and electrically shielded type. A powdered iron core may be used for the radio frequency transformers of the system as well as for the intermediate frequency transformers.

The secondary winding of loop transformer 15 is shunted by tuning condenser 16. The output of loop transformer 15 is connected to the control grid electrode of radio frequency amplifier pentode 82 for further amplification and introduction to the control grids of balanced modulator stage 32. The gain of loop amplifier 82 is manually controllable by rheostat 83 connecting the cathode thereof to ground. The anode of amplifier 82 is energized through a shunt radio frequency choke coil 85 connected to the B supply. The output of loop amplifier 82 is coupled to the control grids of tubes 86, 86' of modulator 32 through coupling condensers 87, 87'. The cathodes of tubes 86, 86' are tied together and connected to ground through by-pass condenser 88 and a biasing resistance net-work 89, 90, 91 controlled by selector switch 100 to be described. An audio frequency oscillator 31 comprising two triodes 92, 92' is arranged to generate an audio or tone frequency current of a relatively low frequency. The control grids of triodes 92, 92' are coupled to the anodes thereof by condensers 93, 93'. Cathodes of the oscillator triodes are tied together and connectable to ground through biasing resistor 94.

Oscillator 31 is normally operative when the circuit of biasing resistor 94 is completed to ground. A ground connection therefor is afforded when selector switch 100 is in position 3 for automatic direction indicator operation. An "automatic null" switch 95 is provided to connect biasing resistor 94 to ground when selector switch 100 is not at position 3, but for example at position 1 for reception at "loop only." Switch blade 95 is normally mechanically biased away from contact 96. By manually pressing blade 95 as for example 95', against contact 96, oscillator circuit 31 is completed and a tone signal is generated for automatic loop rotation control operation. Thus, the pilot can effect automatic null operation during "loop only" reception, with bi-directional ambiguity resulting in this case. The B supply for the anodes of oscillator triodes 92 is arranged through a center-tapped inductance 96' connected to the B supply through resistor 97. A condenser 98 and resistance 99 are shunted across inductance coil 96' and together predetermine the frequency generated by oscillator 31. Resistors 101 and 102 are coupled between the grid electrodes of triodes 92, 92' and ground. Intermediate tapes 103 and 104 on respective resistors 101 and 102 couple a portion of the available alternating current tone energy from oscillator 31 to the grids of modulator triodes 86, 86' through coupling resistances 105, 106, of about one megohm each and through coupling condenser 107, 107'. Further resistances 108 and 109 normally connect grid coupling resisters 105 and 106 to ground to stabilize the grid circuits thereof.

Control grid electrodes of modulator triodes 86, 86' simultaneously receive the audio frequency tone signal from oscillator 31 and the radio frequency signal picked up by directional antenna 10. The electrical interaction of the respective signals is described in connection with Fig. 3 of the parent patent. The output of modulator stage 32, obtained through the anodes of tubes 86, 86' is connected to opposite sides of radio frequency winding 33 coupled to secondary winding 24 of the non-directional antenna circuit. The anode supply for modulator tubes 86, 86' is obtained through a center tap on winding 33 connected to the common B supply as indicated. The frequency of the loop modulated signals is the sum and difference of the received radio signals and the low frequency oscillator tone signal. The simultaneous induction of the non-directional radio frequency signals with the tone modulated loop signals upon winding 24, produces a resultant signal upon control grid 110 of radio frequency amplifier 80. The non-directional signal from antenna 20 serves as a reference signal or sense determinator, so that the right or left sense of the loop antenna signals is established for further control action on the loop antenna. Thus proper functioning of the automatic directional system is assured, bringing the loop antenna back to its null signal position to give accurate indications.

The signals impressed upon the control grid of radio frequency pentode 80 are amplified and transmitted through output radio frequency transformer 111 having its secondary winding tuned to resonance by variable condenser 112 shunted there-across. The output of transformer 111 is coupled to intermediate grid electrode 115 of the radio frequency mixer stage 120 through coupling condenser 116. Radio frequency mixer 120 is shown as a hexode wherein grid electrode 117 adjacent to the cathode is energized by a signal emanating from a local beat frequency oscillator 121 operated in the usual manner for superheterodyne reception. The showing of beat frequency oscillator 121 in block diagram form is believed sufficient, it being understood that the beating frequency is controlled by a unitary tuning means connected with the variable tuning condensers of the radio frequency circuits. The anode and screen grid operating potential is supplied through respective resistors 122, 123.

The output of radio frequency mixer stage 120 comprises primary winding 125 of a step-down intermediate frequency transformer shunted by adjustable condenser 127 for resonating the coil at the intermediate frequency, such as 455 kilocycles. Transformer 125, 126 is a step-down transformer so that a long low impedance transmission line 130 may be used to permit placing the intermediate frequency and audio frequency amplifier equipment remote from the radio frequency section including the directional and non-directional radio signal amplifiers, and the loop modulator stage. This arrangement also makes it feasible to utilize the radio frequency and intermediate frequency sections with much higher gain than with the conventional combined type of construction. Transmission cable 130 is an electrically shielded low impedance cable, which may well be 12 feet in length, terminating in a correspondingly low impedance primary winding 131 of step-up intermediate frequency transformer 131, 132. Secondary winding 132 of the terminating transformer is shunted by a resonating adjustable condenser 133 to tune the transformer to the intermediate frequency used.

The output of step-up intermediate frequency transformer 131, 132 is connected to the grid electrode indicated at 134 of the input stage of two-stage intermediate frequency amplifier 135 shown in block diagram. The anode indicated at 136 of output stage of intermediate frequency amplifier 135 is connected to transformer 137, the primary and secondary windings of which are respectively shunted by adjustable condensers 138 and 139 and tuned to the intermediate frequency. An audio frequency detector stage 140 has its control grid 141 connected to the output of intermediate frequency transformer 137 for demodulating the signals and producing corresponding audio frequency currents across cathode resistor 145 connected to ground. Both the radio signal modulations as well as the tone or control signal, if present, produce the corresponding audio frequency signal across resistor 145 by the detector action. The anode of detector 140 is connected to the common B supply as indicated. Condenser 146, between the cathode of detector 140 and ground, by-passes the higher order frequency currents from the audio frequency path.

The audio frequency signals are coupled to audio frequency pentode amplifier stage 150 by coupling condenser 148. The anode circuit of amplifier 150 comprises resistance 151 connected to the common B supply and is coupled to the control grid 152 of a second audio frequency amplifier stage 155 through coupling condenser 153. Second audio frequency amplifier stage 155 is resistance-capacity coupled by anode resistor 156 and coupling condenser 157 to a further two-stage audio frequency amplifier 160. It is to be understood that both the original audio frequency signal modulations and the control or tone signal amplified together therewith, are impressed upon two stage amplifier 160 for further amplification to an appreciable signal level. The output of amplifier 160 is coupled to the aural amplifier indicated at 170, to the output of which earphones 175 are connected. The pilot adjusts the aural level of the signals by a separate manual control in aural unit 170. The output of audio frequency amplifier 160 is also coupled to further amplifier stages 180 and 190 for selecting and further amplifying the control signal and impressing it upon relay control system 45.

The output of audio frequency amplifier 160 is coupled to the control grid of amplifier stage 180 by coupling condenser 161 and phase shifting network 162, 163. Resistor 165 is shunted across phase shifting network 162, 163 connecting the control grid of stage 180 to ground. The relative impedances of resistor 162 and condenser 163 are chosen to suitably shift the phase of the control signal to be impressed upon control grid 181 to compensate for any misphasing thereof caused in the circuits prior to that point. Such phasing is made to cause the phase relation of the signal arriving at the input of tube relay control system 45 to be substantially in-phase or 180 degrees out-of-phase with the correspondingly impressed tone signal from amplifier 43.

Phase shifter network 162, 163 may assume other forms than the simple one shown, or be positioned at another part of the circuit. In practice, negligible relative phase shift of the 102.5 cycle tone occurs due to its passing through the amplifier and detector circuits, some phase shifting however occuring at loop signal modulator 32 due to attenuation through resistors 105, 106. The purpose of phase shifter network 162, 163, schematically indicated at 41 in Fig. 1, is to compensate for phase shifts with respect to the reference phase position as determined by the tone signal at oscillator 31, to insure the arrival of both the control signal and reference tone signal upon control system 45 in substantially in phase or 180 degree out-of-phase relation for maximum effect. The control action on system 45 is described in detail in connection with Figs. 4 and 4a of the parent patent.

The control signal impressed upon control grid electrode 181 of pentode amplifier stage 180 is amplified in a conventional manner. The output of amplifier 180 is impressed upon control grid 191 of a further amplifier stage 190 through coupling condenser 182. A tuned filter 185, 186 is used to filter out other signals or modulations, and most efficiently pass the signal frequency corresponding to the control signal, namely 102.5 cycles. Other filter arrangements than the shunt choke coil 185 and condenser 186 may be used. The function of filter 185, 186, which corresponds to pass-filter 42 shown in Fig. 1, is to substantially reject other frequencies but efficiently pass the control signal frequency. Amplifier stage 190 comprises a triode tube, the anode circuit of which includes primary winding 192 of audio frequency coupling transformer 195. Secondary winding 196 of transformer 195 is shown schematically coupled to the input of the relay control system 45. The output of 102.5 cycle amplifier 43 is impressed upon relay control system 45.

A voltage regulator tube 200 is connected between a particular point 265 and ground, to maintain a predetermined and uniform operating voltage supply for the critical part of the control system which includes the anodes of oscillator stage 31 through lead 202, the amplifier 43 through lead 267 and relay system 45 through lead 266. An automatic level or volume control arrangement is provided for the direction indicator circuit by rectifier 210 fed by an intermediate frequency signal tapped from intermediate frequency output anode 136 through coupling condenser 211 to anode 212 of rectifier 210. Delayed automatic volume control (D. A. V. C.) action is obtained by providing a positive biasing control action till the received radio signals reach a predetermined level. Anode 212 of rectifier 120 is connected to the control grids of the respective radio frequency, intermediate frequency and audio frequency stages of the circuit to establish a substantially flat and uniform amplification response of the signals through the system. Coupling resistances 215, 216, 217, 218 are used in the level control circuit, and control grid 134 of the intermediate frequency amplifier is connected by direct connection 219 through secondary winding 132. The second stage of the intermediate frequency amplifier 135 is preferably also controlled by the level control circuit described.

A manual switch 220 is provided at the cathode of the first radio frequency amplification stage 80 to disconnect the effect of the automatic volume control through resistor 215, when it is preferred to manually control the bias through variable resistor 222 in the cathode circuit. The manual volume control is useful for communication or reception of radio range signals. A second volume control is optionally provided in aural amplifier 170 to permit adjustment of the level in earphones 175 independently of the system. Loop signal gain control 83 is provided, as already described, to adjust the sensitivity of the loop signal and directional indications in general.

A further switch 225 is provided for continuous wave beat frequency oscillator 230 to connect it to audio frequency detector stage 140 for heterodyning continuous waves. Continuous wave oscillator 230 is used for receiving continuous wave transmission and serves as a signal "station finder" for locating weak or distant radio stations. The tone of the heterodyne beat note is varied by adjusting a component such as the inductance or capacitance of the oscillator circuit 230. The normal connection of switch 225 to ground contact 226 is schematically indicated for rendering oscillator 230 ineffective as a heterodyning means, which connection is used for phone reception. By ungrounding switch 225, oscillator 230 becomes effective for heterodyne reception of continuous waves.

A further useful circuital element of the invention comprises direct current milemeter 240 connected between the output of automatic volume control stage 210 and ground, through series resistance 241. Meter 240 serves as a measure of the automatic biasing current and indicates the relative signal strengths of the received radio signals. Meter 240 serves as a relative distance or milemeter. Flight toward a station increases the signal strength and therefore the indication on meter 240. Flight away from a station correspondingly decreases its indication. Milemeter 240 is a very useful device for the pilot and is located in the cockpit. Besides, its function as a relative distance meter for judging the approximate distance of the aircraft to the radio station, it may be used as a very positive, accurate, and reliable means of determining the null position when the loop antenna alone is used for bi-directional compassing during precipitation static conditions. Minimum dip of meter 240 will correspond to absolute aural null of the loop antenna. Another use for instrument 240 is as a tuning indicator to show when a radio station is properly tuned in. This is significant for a highly selective receiver such as the direction finder circuit design. Meter 240 has a further use in indicating when the pilot is passing over a broadcast station by giving a pronounced dip when directly over a station using a vertical radiator. The needle 65 of automatic direction indicator 64 will reverse its indication by turning around 180 degrees from its reading as soon as the aircraft passes beyond the radio station.

An important feature of the direction finder circuit shown in Fig. 2 is the three-way selector switch 100 to effect different modes of operation of the system. Using three position switch 100, the pilot may quickly connect the circuit for operation on: (1) "loop only," as a visual null, aural null, or minimum signal type of direction finder, or for loop reception during precipitation static conditions; (2) "regular only," wherein the non-directional antenna is used for communication and radio range navigation; or (3) "automatic" direction indicator.

When switch blades a, b, c, of selector 100 are moved to position 1 corresponding to "loop only" reception, contact 250 is grounded through blade

*a*. Contact 250, connected directly to non-directional antenna 20 through lead 251, short circuits the non-directional signals and renders them ineffective. At the same time the cathode circuit of oscillator tubes 92, 92′ are ungrounded since blade *a* is removed from contact 253. No tone signal is then impressed upon modulator stage 22. Should the pilot desire automatic rotation of the loop to null, he presses switch 95 against contact 96 completing the cathode circuit to ground.

A null indication in the "loop only" position is bi-directional, but useful when precipitation static conditions are encountered in flight. By turning the loop near its maximum signal reception position, communication reception is feasible. By viewing meter 240 the pilot can obtain reliable directional determinations by the minimum or maximum signal strength positions. Biasing resistor 91 remains shorted to ground through switch blade *b* and contact 260. Grid resistor 109 of modulator tube 86′ is disconnected from ground and connected to an intermediate biasing potential at resistors 89 and 90 through contact 261. Such connection of resistor 109 decreases the negative bias between the grid and cathode of tube 86′. Section 86′ of modulator 32 is accordingly rendered more sensitive for signal amplification than tube 86 which normally is biased near cut-off. The loop signals are accordingly amplified through section 86′ and impressed upon radio frequency amplifier stage 80 by coupling coil 33 and through the remainder of the system.

With selector switch 100 in position 2, non-directional antenna 20 normally impresses radio signals upon the system, switch blades *a* and *b* being connected to intermediate contacts 252 and 262 respectively. Resistor 91 is unshorted and is effective in substantially increasing the biasing voltage upon modulator stages 86, 86′. The total value of the resistance placed in the cathode to ground circuit for modulator 32 is designed to be sufficiently large to over bias the modulator tubes 86, 86′ and prevent the passage of loop radio signals or any tone frequency. Cathode resistor 94 of oscillator stage 31 remains ungrounded since contact 253 is unconnected. An electronic method is thus provided for disabling the automatic direction indicating action without the use of radio frequency switching. The result is to provide reception by the system as a radio receiver without any directional characteristics. With selective switch 100 in position 2, the pilot uses the system as a sensitive communication receiver or for radio beacon range reception.

With selector switch 100 in position 3, the biasing of modulator stage 86, 86′ is returned to normal by short-circuiting resistor 91 through switch blade *b*, properly biasing oscillator 92, 92′ by connecting biasing resistance 94 to ground through switch blade *a*, normally grounding grid resistor 109. For automatic bi-directional operation, selector switch 100 is placed in position 3 in the modified arrangements of the unidirectional system shown in Figs. 3 and 4.

Figure 3:
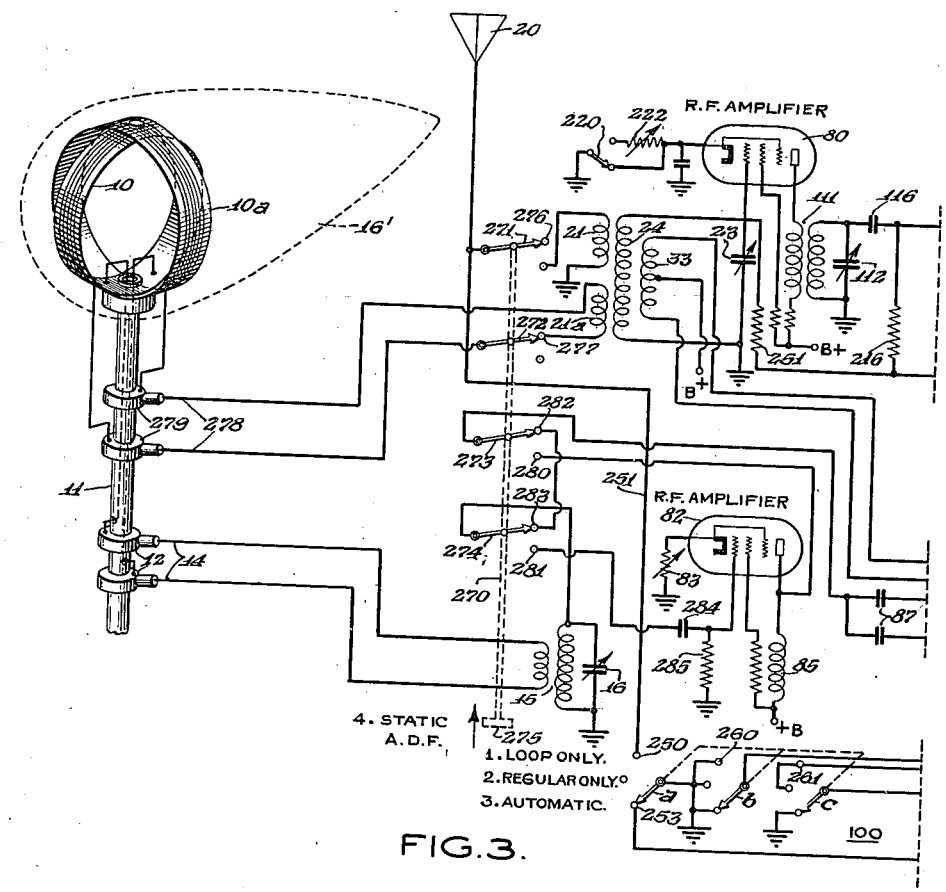
Fig. 3 is an electrical diagram of part of the radio directional system of Fig. 2, incorporating an auxiliary directional antenna in circuit with switching means for converting the system to bi-directional reception.

Fig. 3 is an electrical diagram illustrating the arrangement for converting the automatic unidirectional radio indicator system of Figs. 1 and 2 to bi-directional operation for severe static conditions. Only a portion of the complete circuit is shown, it being understood that the remainder corresponds to that illustrated in Fig. 2. Other radio directional circuits may be used in practicing my invention. Broadly, the conversion from unidirectional to bi-directional reception in accordance with the invention is accomplished by substituting a directional or loop antenna for the non-directional antenna, and simultaneously compensating for the difference in phase shift of their respective signal outputs. Switching means are employed to readily effect the conversion from the unidirectional to bi-directional reception, or vice versa.

The unidirectional system comprises rotatable loop antenna 10 secured to shaft 11 within streamline housing 16′, and non-directional antenna 20 as described in conjunction with Figs. 1 and 2. Loop antenna 10 is connected to the primary of radio frequency transformer 16 through slip rings 12 and transmission cable 14. The circuit components of Fig. 3 bearing the same numerals as corresponding components of Fig. 2 are identical. A four-pole double-throw switch operated by schematically indicated rod 270 contains switch-arms or poles 271, 272, 273, 274 operable in two positions. Position 4, marked "Static A. D. F." refers to the circuit conversion by four-pole switch 270 to automatic bi-directional operation for static reception conditions. The conversion position is accomplished by pressing button 275 of switch-rod 270 as indicated by the arrow, which position thereof is as illustrated in Fig. 3.

When switch 270 is moved to the conversion position, non-directional antenna 20, normally connected to primary coil 21 of radio frequency antenna transformer, is disconnected therefrom and connected to blank contact 276 by arm 271. The auxiliary loop antenna 10a which is physically secured on rod 11 with loop antenna 10, is electrically connected to auxiliary primary winding 21a coupled with secondary winding 24 of the radio frequency antenna transformer by switch-arm 272 and contact 277, transmission cable 278 and slip rings 279. Switch-arms 271 and 272 accordingly substitute auxiliary directional antenna 10a for fixed non-directional antenna 20 in coupling relationship with secondary winding 24 of the antenna transformer.

Auxiliary antenna 10a is preferably arranged in 90° spaced relationship with respect to antenna 10. Thus when antenna 10 is in its minimum signal reception position, auxiliary antenna 10a is in its maximum signal reception position. A reference signal is thereupon impressed upon radio frequency amplifier stage 80 in a manner similar to that of non-directional antenna 20. Due to the characteristic of a loop antenna to substantially minimize static and parasitic signal reception in relation to the desired radio signal, as compared to reception by a non-directional antenna, a substantially improved signal-to-noise ratio is impressed upon radio frequency amplifier 80. Since loop antenna 10 is automatically kept in the null signal position with respect to the received radio waves, auxiliary directional antenna 10a is correspondingly in the maximum signal reception position, and impresses a signal of substantial magnitude upon radio frequency amplifier 80. Intelligible aural reception is accordingly also afforded during even severe static conditions.

All the required signal components are thus present for the operation of the automatic directional system, and reliable and accurate automatic directional indication is afforded in a manner similar to that described in connection with Figs. 1 and 2. In view of the bi-directional characteristic of the auxiliary loop antenna 10a, however, in place of the non-directional characteristic of antenna 20, a 180° ambiguity is present in the resultant indications. Thus, although the angular position of the indications are accurate within the tolerance of the automatic unidirectional operation giving an "in-line" accuracy, there remains the 180° ambiguity of the in-line indication. The in-line accuracy is an important asset during the static reception conditions, when unidirectional operation with the non-directional antenna 20 is often rendered indefinite. The 180° ambiguity may be resolved by momentarily switching over for operation as a unidirectional system, and ascertain the quadrant of the unidirectional indications, or by other navigational procedure or reference to navigational instruments.

In carrying out the bi-directional reception with the two loop antennae, I provide a compensating 90° phase shift to one of the radio frequency channels for counteracting the 90° displacement existing in the circuit between the non-directional antenna 20 channel and directional antenna 10 channel during the unidirectional mode of operation. As previously described, shunt coil 85 is in the anode circuit of r. f. amplifier tube 82 shown in Fig. 2. Coil 85 provides a 90° phase shift to loop 10 signals amplified by tube 82, so that the directional and non-directional signal channels are placed in substantially inphase or 180° out-of-phase relationship for effecting the automatic directional operations. Further details of the theory and effect of this circuit detail in effecting uni-directional indications are to be found in the above mentioned parent patent. When the auxiliary directional antenna 10a is substituted for the non-directional antenna 20, the phase relationship of the signal channels of the directional antennae 10 and 10a antennae are in-phase or 180° out-of-phase. When the system is converted to bi-directional operation, I effect a 90° channel phase shift in the unidirectional circuit, concurrent with the substitution of the auxiliary loop antenna 10a for the non-directional antenna 20.

I accomplish the 90° channel phase shift in the circuit of Fig. 3 by switch-arms 273, 274 of four-pole switch 270. When switch-arms 273, 274 connect with contacts 280, 281 in the unidirectional operation position, the radio frequency amplifier stage 82 and the associated shunt coil 85 are in their normal circuit relation of Fig. 2. When switch 270 is moved to the position illustrated in Fig. 3, blades 273, 274 connect with contacts 282, 283 respectively and bypass the radio frequency amplifier 82 and associated shunt coil 85. This switching arrangement effects the connection of the secondary of loop radio frequency transformer 15 directly to loop modulator stage 32 through coupling condensers 87, 87. The by-passing of radio frequency amplifier stage 82 and the associated capacitive radio frequency shunt coil 85 eliminates the original 90° phase shift interposed between the signal channels of loop antenna 10 and non-directional antenna 20. The in-phase or 180° out-of-phase relationship of the signal channels of loop antennae 10 and 10a are retained in the remainder of the circuit for proper operation thereof. Coupling condenser 284 and grid leak condenser 285 are added to the control grid of radio frequency amplifier 82 to keep it stable despite the switching.

The bi-directional conversion arrangement of Fig. 3 reduces the over-all amplification of the signals from loop antenna 10 due to the elimination of radio frequency amplifier stage 82. Where a maximum sensitivity of directional indication is desired, I provide an alternative bi-directional conversion arrangement, retaining radio frequency amplifier stage 82, in a manner indicated in Fig. 4. Switch arms 273, 274 of four-pole switch 270 are arranged to replace the 90° shifting shunt coil 85 by a normal radio frequency transformer coupling arrangement to bring the signal channels introduced by loop antennae 10 and 10a into phase or 180° out-of-phase relationship. Anode 290 of radio frequency amplifier stage 82 is connected to switch-arm 274. When switch-arm 274 is in the unidirectional position contacting element 281, shunt coil 85 is in normal connection with anode 290. Anode 290 is connected to contact 280 as well, which is in connection with switch-arm 273 during the unidirectional operation, and in turn coupled to the modulator stage 32 through condensers 87, 87, in the manner of Fig. 2.

Figure 4:
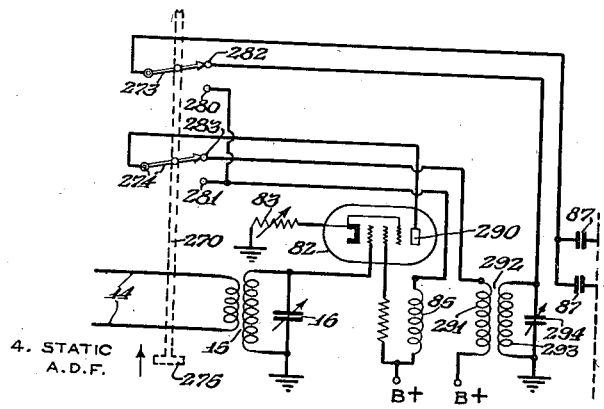
Fig. 4 is a partial diagrammatic representation of a modified arrangement of the bi-directional conversion system of Fig. 3.

When switch arms 273, 274 are in the bi-directional position illustrated in Fig. 4, anode 290 is disconnected from shunt coil 85 and is connected to primary winding 291 of radio frequency coupling transformer 292 through contact 283. Across secondary winding 293 of radio frequency transformer 292 is connected a variable shunt condenser 294 for the radio frequency tuning. Condenser 294 is preferably ganged with the other variable condensers of the circuit for tuning. The output of secondary 293 is connected to radio frequency modulator stage 32 through switch arm 273, as indicated. The remainder of the directional receiver circuit is similar to Figs. 1 and 2. The resultant bi-directional operation is with the same angular accuracy as for uni-directional operation.

The manually operable switching member 270, 275 for converting the system at position 4 to "Static ADF" operation may be remotely controlled through an electrical solenoid. The pushbutton or switch for the electrical solenoid corresponding to position 4 may thus be placed directly on the control panel, and the switch armatures 271, 272, 273, 274 may be located in the chassis adjacent the radio frequency coils and circuit they are connected to.

Although I have described preferred arrangements for carrying out the principles of my invention, I am aware that modifications therein are feasible, and accordingly I do not intend to be limited except as set forth in the following claims.

What I claim is:

1. In a radio directional system, a non-directional antenna and a radio frequency amplifier coupled thereto, a rotatable directional loop antenna, a balanced modulator stage responsive to signals from said loop antenna, means for biasing said modulator stage to substantially near cut-off, a control signal oscillator in circuit connection with said modulator stage to modulate radio frequency signals received by said loop antenna, means including circuit connections for coupling the output of said modulator stage to said radio frequency amplifier, means responsive to the output of said radio frequency amplifier for indicating the direction of the radio waves and means including circuit connections to said modulator section for selectively converting the system for effective operation solely on either one of said antennae.

2. In a radio directional system, a non-directional antenna and a radio frequency amplifier coupled thereto, a directional antenna, a balanced modulator stage responsive to signals from said directional antenna, impedance means for biasing said modulator stage to substantially near cut-off, means including circuit connections for coupling the output of said modulator stage to said radio frequency amplifier, means for selectively converting the system for operation on only one of said antennae comprising switching means including circuit connections for simultaneously short-circuiting the received non-directional signals and biasing said balanced modulator section to permit passage of the directional antenna signals through one-half thereof whereby operation on the directional antenna only is effected.

3. In a radio directional system, a non-directional antenna and a radio frequency amplifier coupled thereto, a rotatable directional antenna, a balanced modulator stage responsive to signals from said directional antenna, impedance means for biasing said modulator stage to substantially near cut-off, a control signal oscillator in circuit connection with said modulator stage to modulate radio frequency signals received by said directional antenna, means including circuit connections for coupling the output of said modulator stage to said radio frequency amplifier, means responsive to the output of said radio frequency amplifier for indicating the direction of the radio waves, and means for selectively converting the system for effective operation on only one of said antennae comprising switching means including circuit connections for simultaneously grounding the received non-directional signals, rendering said oscillator inoperative and unbalancing the biasing of said balanced modulator section to permit passage of the directional antenna signals through one-half thereof whereby operation on the directional antenna only is effected.

4. In a radio directional system, a non-directional antenna and a radio frequency amplifier coupled thereto, a directional antenna, a balanced modulator stage responsive to signals from said directional antenna, impedance means for biasing said modulator stage to substantially near cut-off, means including circuit connections for coupling the output of said modulator stage to said radio frequency amplifier, and means for selectively converting the system for operation on only one of said antennae comprising switching means including circuit connections for simultaneously short-circuiting the non-directional antenna signals and biasing said balanced modulator section to permit passage of the directional antenna signals through one-half thereof, whereby operation on the directional antenna only is effected, and alternatively for overbiasing said balanced modulator to effectively suppress the directional antenna signals from the system for operation on only the non-directional antenna signals.

5. In a radio directional system, a non-directional antenna and a radio frequency amplifier coupled thereto, a rotatable directional antenna, a balanced modulator stage responsive to signals from said directional antenna, means for biasing said modulator stage to substantially near cut-off, a control signal oscillator in circuit connection with said modulator stage to modulate radio frequency signals received by said directional antenna, means including circuit connections for coupling the output of said modulator stage to said radio frequency amplifier, means responsive to the output of said radio frequency amplifier for indicating the direction of the radio waves, and means for selectively converting the system for operation on only one of said antennae comprising switching means including circuit connections for overbiasing said balanced modulator and rendering said oscillator inoperative to effectively suppress the directional antenna signals in the system for operation only on the non-directional antenna signals.

6. In an automatic radio directional system, a non-directional antenna and a radio frequency amplifier coupled thereto, a rotatable directional antenna, a balanced modulator stage responsive to signals from said directional antenna, impedance means for biasing said modulator stage to substantially near cut-off, a control signal oscillator in circuit connection with said modulator stage to modulate radio frequency signals received by said directional antenna, means including circuit connections for coupling the output of said modulator stage to said radio frequency amplifier, means responsive to the output of said radio frequency amplifier for rotating said directional antenna into the null signal reception position, and means for selectively converting the system for operation on only one of said antennae comprising switching means including circuit connections for simultaneously grounding the received non-directional signals, rendering said oscillator inoperative and unbalancing the biasing of said balanced modulator section to permit passage of the directional antenna signals through one-half thereof whereby operation on the directional antenna only is effected and for over-biasing said balanced modulator and rendering said oscillator inoperative to effectively suppress the directional antenna signals in the system for operation only on the non-directional antenna signals.

7. In a radio directional system, a non-directional antenna, a radio frequency amplifier coupled to said non-directional antenna, a rotatable directional antenna, means responsive to signals from said directional antenna for modulating the directional signals with a control signal, means including circuit connections for shifting the phase between the directional and non-directional signals by 90° for introducing them to said radio frequency amplifier substantially in-phase or 180° out-of-phase relation, means responsive to the output of said radio frequency amplifier including said control signal for effecting unidirectional bearings on the radio transmitter station, a second directional antenna mounted with said first mentioned rotatable directional antenna, and switching means including circuit connections for substituting the coupling of said non-directional antenna with said second directional antenna to said radio frequency amplifier and rendering said 90° phase shifting means ineffective whereby the signal channels of both of said directional antennae are placed substantially in-phase or 180° out-of-phase relation at said radio frequency amplifier and bi-directional bearings are effected by said directional antennae on the radio transmitter.

8. In a radio directional system, a non-directional antenna, a radio frequency amplifier coupled to said non-directional antenna, a directional antenna, means responsive to signals from said directional antenna for modulating the directional signals with a control signal, means including circuit connections for shifting the phase between the directional and non-directional signals for introducing them to said radio frequency amplifier substantially in-phase or 180° out-of-phase relation, a second directional antenna mounted with said first mentioned directional antenna, and switching means including circuit connections for substituting the coupling of said non-directional antenna with said second directional antenna to said radio frequency amplifier and rendering said phase shifting means ineffective whereby the signal channels of both of said directional antennae are placed substantially in-phase or 180° out-of-phase relation at said radio frequency amplifier and bi-directional bearings are effected by said directional antennae on the radio transmitter.

9. In a radio directional system, a non-directional antenna, a first radio frequency amplifier coupled to said non-directional antenna, a rotatable directional antenna, a second radio frequency amplifier coupled to said directional antenna, means responsive to the output of said second radio frequency amplifier for modulating the directional signal output thereof with a control signal, means including circuit connections for shifting the phase of the directional signals by 90° for introducing them to said first radio frequency amplifier substantially in-phase or 180° out-of-phase relation, means responsive to the output of said first radio frequency amplifier including said control signal for effecting unidirectional bearings on the radio transmitter station, a second directional antenna mounted with said first mentioned rotatable directional antenna in a 90° angular relationship, and switching means including circuit connections for substituting the coupling of said non-directional antenna with said second directional antenna to said first radio frequency amplifier and simultaneously rendering said 90° phase shifting means ineffective whereby the signal channels of both of said directional antennae are placed substantially in-phase or 180° out-of-phase relation at said first radio frequency amplifier and bi-directional bearings are effected by said directional antennae on the radio transmitter.

10. In a radio directional system, a non-directional antenna and a radio frequency amplifier coupled thereto, a rotatable directional antenna, a balanced modulator stage responsive to signals from said directional antenna, impedance means for biasing said modulator stage to substantially near cut-off, a control signal oscillator in circuit connection with said modulator stage to modulate radio frequency signals received by said directional antenna, means including circuit connections for coupling the output of said modulator stage to said radio frequency amplifier for indicating the direction of the radio waves, means for selectively converting the system for effective operation on only one of said antennae comprising switching means including circuit connections for simultaneously grounding the received non-directional signals, rendering said oscillator inoperative and unbalancing the biasing of said balanced modulator section to permit passage of the directional antenna signals through one-half thereof whereby operation on the directional antenna only is effected, and manually operable means including a switch normally biased to an open position effective, when operated while the system is so converted, to render said oscillator operative to effect automatic direction indication.

11. In an automatic radio directional system, a non-directional antenna and a radio frequency amplifier coupled thereto, a rotatable directional antenna, a balanced modulator stage responsive to signals from said directional antenna, impedance means for biasing said modulator stage to substantially near cut-off, a control signal oscillator in circuit connection with said modulator stage to modulate radio frequency signals received by said directional antenna, means including circuit connections for coupling the output of said modulator stage to said radio frequency amplifier, means responsive to the output of said radio frequency amplifier for rotating said directional antenna into the null signal reception position, means for selectively converting the system for operation on only one of said antennae comprising switching means including circuit connections for simultaneously grounding the received non-directional signals, rendering said oscillator inoperative and unbalancing the biasing of said balanced modulator section to permit passage of the directional antenna signals through one-half thereof whereby operation on the directional antenna only is effected and for overbiasing said balanced modulator and rendering said oscillator inoperative to effectively suppress the directional antenna signals in the system for operation only on the non-directional antenna signals, and manually operable means, including a switch normally biased to an open position effective, when operated while the system is so converted, to render said oscillator operative to effect automatic operation of such directional antenna rotating means.

12. In a radio directional system, a non-directional antenna, a first radio frequency amplifier coupled to said non-directional antenna, a rotatable directional antenna, a second radio frequency amplifier coupled to said directional antenna, means responsive to the output of said second radio frequency amplifier for modulating the directional signal output thereof with a control signal, means including circuit connections interposed between said directional antenna and said second amplifier for shifting the phase of the directional signals by 90° for introducing them to said first radio frequency amplifier substantially in-phase or 180° out-of-phase relation, means responsive to the output of said first radio frequency amplifier including said control signal for effecting unidirectional bearings on the radio transmitter station, a second directional antenna mounted with said first mentioned rotatable directional antenna in a 90° angular relationship, and switching means including circuit connections for substituting the coupling of said non-directional antenna with said second directional antenna to said first radio frequency amplifier and simultaneously by-passing said 90° phase shifting means and said second amplifier, whereby the signal channels of both of said directional antennae are placed substantially in-phase or 180° out-of-phase relation at said first radio frequency amplifier and bi-directional bearings are effected by said directional antennae on the radio transmitter.

WILLIAM P. LEAR.